United States Patent
Banipal et al.

(10) Patent No.: US 12,192,599 B2
(45) Date of Patent: Jan. 7, 2025

(54) ASYNCHRONOUS CONTENT ANALYSIS FOR SYNCHRONIZING AUDIO AND VIDEO STREAMS

(71) Applicant: International Business Machines Corporation, Armonk, NY (US)

(72) Inventors: Indervir Singh Banipal, San Jose, CA (US); Shikhar Kwatra, San Jose, CA (US); Vijay Ekambaram, Chennai (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 18/333,132

(22) Filed: Jun. 12, 2023

(65) Prior Publication Data

US 2024/0414418 A1 Dec. 12, 2024

(51) Int. Cl.
*H04N 21/8547* (2011.01)
*H04N 21/233* (2011.01)
(Continued)

(52) U.S. Cl.
CPC ....... *H04N 21/8547* (2013.01); *H04N 21/233* (2013.01); *H04N 21/23418* (2013.01); *H04N 21/242* (2013.01)

(58) Field of Classification Search
CPC ............. H04N 21/8547; H04N 21/233; H04N 21/23418; H04N 21/242
(Continued)

(56) References Cited

U.S. PATENT DOCUMENTS

| 5,608,839 A | 3/1997 | Chen |
| 7,149,686 B1 | 12/2006 | Cohen et al. |

(Continued)

FOREIGN PATENT DOCUMENTS

| CN | 101521812 B | 10/2010 |
| EP | 0890171 B1 | 10/2002 |
| EP | 2346260 A1 | 7/2011 |

OTHER PUBLICATIONS

TechXplore, "A deep learning technique to generate real-time lip sync for live 2-D animation," Year: 2019, pp. 1-5 https://techxplore.com/news/2019-11-deep-technique-real-time-lip-sync.html.
(Continued)

*Primary Examiner* — Helen Shibru
(74) *Attorney, Agent, or Firm* — Patterson + Sheridan, LLP (57) ABSTRACT

Embodiments of the present disclosure provide systems and methods for synchronizing an unaligned audio stream and a corresponding unaligned video stream of real time streaming media. A non-limiting disclosed method comprises performing, using a video classifier, video reference point classification of a video stream based on an audio-video dataset; performing, using an audio classifier, audio reference point classification of the audio stream based on the audio-video dataset. The system correlates object related reference points in video segments of the video stream and in audio segments of the audio stream to identify a set of audio-video synchronization candidates. The system compares context of the set of audio-video synchronization candidates to identify an audio-video synchronization candidate to synchronize the audio stream and video stream based on reference point alignment.

20 Claims, 7 Drawing Sheets

(51) Int. Cl.
  *H04N 21/234* (2011.01)
  *H04N 21/242* (2011.01)
(58) Field of Classification Search
  USPC .................................................. 386/241, 201
  See application file for complete search history.

(56) References Cited

U.S. PATENT DOCUMENTS

| | | | | |
|---|---|---|---|---|
| 7,480,386 | B2* | 1/2009 | Ogata | G10L 21/00 |
| | | | | 381/310 |
| 8,400,566 | B2 | 3/2013 | Terry et al. | |
| 9,723,180 | B2 | 8/2017 | McRae | |
| 10,534,571 | B2* | 1/2020 | Anderson | G06F 3/1446 |
| 10,820,131 | B1* | 10/2020 | Oliva Elorza | H04S 5/00 |
| 11,026,037 | B2* | 6/2021 | Sridharan | H04S 5/02 |
| 11,513,762 | B2* | 11/2022 | Karri | G06V 40/10 |
| 2013/0141643 | A1 | 6/2013 | Carson et al. | |
| 2024/0169675 | A1* | 5/2024 | Perumalla | G06T 9/00 |
| 2024/0242421 | A1* | 7/2024 | Wang | G06T 15/20 |
| 2024/0282057 | A1* | 8/2024 | Rakshit | G06F 3/16 |

OTHER PUBLICATIONS

Authors et al., "Detection and Rection to Contextual Information based on analysis of a Live Data Stream," ip.com, IP.com No. IPCOM000196971D, Dated: Jun. 22, 2010, pp. 1-5.

E&T Editorial Staff, "Automated lip-syncing made possible with machine learning," E&T Magazine, Dated: Jul. 12, 2017, pp. 1-7.

Bouaziz, B., T. Zlitni, and W. Mahdi. "AViTExt: Automatic video text extraction." CoRR abs/1301.2173 (2013). pp. 1-5.

Bhute, Avinash N., and B. B. Meshram. "Text based approach for indexing and retrieval of image and video: A review." arXiv preprint arXiv:1404.1514 (2014). pp. 1-12.

Paul Miller, "Lip-reading software can identify multiple languages, has big plans for Jupiter," Engadget, Dated: Apr. 25, 2009 pp. 1-3.

Garg, Amit, Jonathan Noyola, and Sameep Bagadia. "Lip reading using CNN and LSTM." Technical report, Stanford University, CS231 n project report (2016) pp. 1-9.

Prakhar Ganesh, "Automated Lip Reading: Simplified," Towards Data Science, Dated: Jun. 3, 2019, pp. 1-10.

MTank, "Multi-Modal Methods: Visual Speech Recognition (Lip Reading)," ML Review, Dated: May 3, 2018, pp. 1-28.

Dany Breslauer et al., "Real-Time Streaming String-Matching," ACM Transactions on Algorithms, Dated: Jun. 2011, pp. 1-12.

Meiguang Jin et al., "Learning to Extract a Video Sequence from Single Motion-Blurred Image," arXiv.org, Dated: Apr. 11, 2018, pp. 1-9.

Jacob L. Newman et al., "Language Identification Using Visual Features," IEEE Transactions on Audio, Speech, and Language Processing, vol. 20, No. 7, Dated: Sep. 2012, pp. 1936-1947.

Knoll, Byron. "Text Prediction and Classification Using String Matching." Department of Computer Science, University of British Columbia (2009), pp. 1-9.

\* cited by examiner

```
┌─────────────────────────────────────────────┐
│ PERFORM, USING A VIDEO CLASSIFIER, VIDEO REFERENCE │
│ POINT CLASSIFICATION OF A VIDEO STREAM BASED ON AN │
│ AUDIO-VIDEO DATASET 702                     │
└─────────────────────────────────────────────┘
                      ↓
┌─────────────────────────────────────────────┐
│ PERFORM, USING AN AUDIO CLASSIFIER, AUDIO REFERENCE │
│ POINT CLASSIFICATION OF AN AUDIO STREAM BASED ON THE │
│ AUDIO-VIDEO DATASET (THE AUDIO-VIDEO DATASET │
│ COMPRISES AUDIO AND VIDEO DATA OF OBJECTS CAUSING A │
│ DOPPLER-EFFECT SOUND IN THE AUDIO STREAM  704 │
└─────────────────────────────────────────────┘
                      ↓
┌─────────────────────────────────────────────┐
│ IDENTIFY, BASED ON THE VIDEO REFERENCE POINT │
│ CLASSIFICATION, A SET OF VIDEO SEGMENTS COMPRISING │
│ OBJECT RELATED REFERENCE POINTS OF RECOGNIZED │
│ OBJECTS IN THE VIDEO STREAM (THE RECOGNIZED OBJECTS │
│ INCLUDE THE DOPPLER-EFFECT SOUND IN THE AUDIO │
│ STREAM)  706                                │
└─────────────────────────────────────────────┘
                      ↓
┌─────────────────────────────────────────────┐
│ IDENTIFY, BASED ON THE AUDIO REFERENCE POINT │
│ CLASSIFICATION, A SET OF AUDIO SEGMENTS COMPRISING │
│ OBJECT RELATED REFERENCE POINTS OF THE DOPPLER- │
│ EFFECT SOUND IN THE AUDIO STREAM  708       │
└─────────────────────────────────────────────┘
                      ↓
┌─────────────────────────────────────────────┐
│ CORRELATE OBJECT RELATED REFERENCE POINTS IN THE │
│ SET OF VIDEO SEGMENTS OF THE VIDEO STREAM AND IN THE │
│ SET OF AUDIO SEGMENTS OF THE AUDIO STREAM TO │
│ IDENTIFY A SET OF AUDIO-VIDEO SYNCHRONIZATION │
│ CANDIDATES  710                             │
└─────────────────────────────────────────────┘
                      ↓
┌─────────────────────────────────────────────┐
│ COMPARE CONTEXT OF THE SET OF AUDIO-VIDEO   │
│ SYNCHRONIZATION CANDIDATES TO IDENTIFY AN AUDIO- │
│ VIDEO SYNCHRONIZATION CANDIDATE TO SYNCHRONIZE THE │
│ AUDIO STREAM AND THE VIDEO STREAM  712      │
└─────────────────────────────────────────────┘
```

FIG. 7

ASYNCHRONOUS CONTENT ANALYSIS FOR SYNCHRONIZING AUDIO AND VIDEO STREAMS

BACKGROUND

The present invention relates to synchronizing audio and video content of real-time streaming content, and more specifically, systems and methods for synchronizing an audio stream and a corresponding video stream of real-time streaming media.

Real-time program streaming media, such as a live news or sports streaming broadcasts, can include a lag or time delay between audio content and video content. A need exists to synchronize an unaligned audio stream and a corresponding unaligned video stream of real-time streaming media to enhance viewer enjoyment.

SUMMARY

Embodiments of the present disclosure provide systems and methods for synchronizing an unaligned audio stream and a corresponding unaligned video stream of real time streaming media.

A non-limiting disclosed method comprises performing, using a video classifier, video reference point classification of a video stream based on an audio-video dataset; and performing, using an audio classifier, audio reference point classification of the audio stream based on the audio-video dataset. The audio-video dataset comprises historical audio-video data of objects causing a Doppler-effect sound in the audio stream, used to classify and match objects within the video stream and the audio stream of real time streaming media. The system identifies, based on the video reference point classification, a set of video segments comprising object related reference points of recognized objects in the video stream; wherein the recognized objects include the Doppler-effect sound in the audio stream. The system identifies, based on the audio reference point classification, a set of audio segments comprising object related reference points of the Doppler-effect sound in the audio stream. The system correlates object related reference points in the video segments of the video stream and the audio segments of the audio stream to identify a set of audio-video synchronization candidates. The system compares context of the set of audio-video synchronization candidates to identify an audio-video synchronization candidate to synchronize the audio stream and video stream based on reference point alignment.

Other disclosed embodiments include a computer system and computer program product for synchronizing an audio stream and a corresponding video stream of real time streaming media, implementing features of the above-disclosed method.

DETAILED DESCRIPTION

Embodiments of the present disclosure provide systems and methods for synchronizing content of an audio stream and a corresponding video stream of real time streaming media.

Disclosed embodiments implement dynamic correlation of a set of objects (e.g., train movement, car or bike movements, and the like) and related reference points in both audio and video frames and enable alignment of the audio and video stream based on the reference point alignment. In a disclosed embodiment, the system classifies and analyzes audio content of an audio stream and classifies and analyzes a video content of a video stream in real-time. The system can identify object related reference points (e.g., train scenes or bike movements, and the like) in both audio and video streams based on audio classification and video classification. The system can perform dynamic correlation of object related reference points based on the reference point alignment to enable alignment of the audio and video stream. The system can perform Doppler frequency analysis through audio and video separating and combining audio and video data based on processing Doppler frequency variants.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
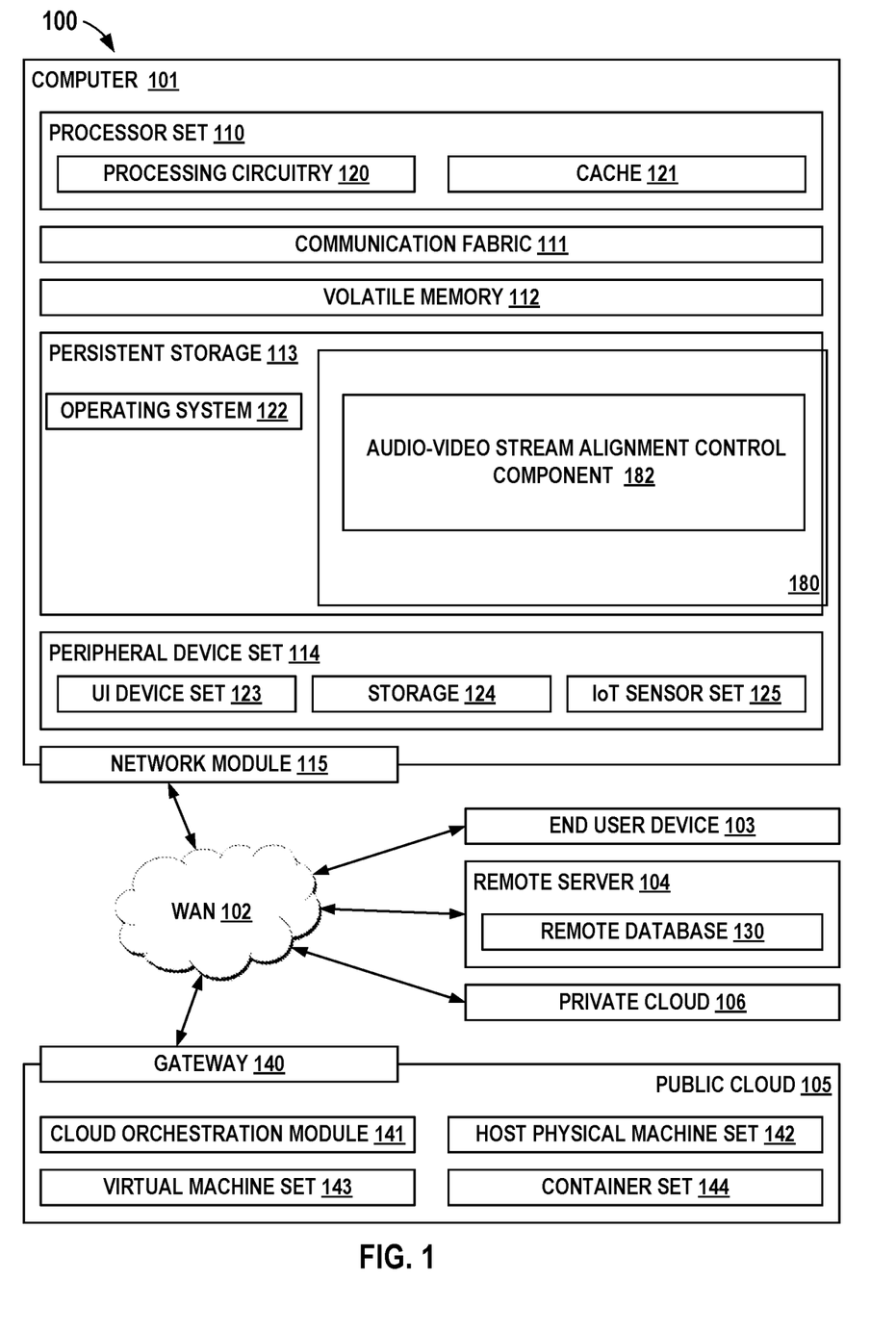
FIG. 1 is a block diagram of an example computer environment for use in conjunction with one or more disclosed embodiments for synchronizing content of an audio stream and a corresponding video stream.

Computing environment 100 contains an example of an environment for the execution of at least some of the computer code involved in performing the inventive methods, such as an Audio-Video Stream Alignment Control Component 182 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide systems and methods for synchronizing an audio stream and a corresponding video stream of real time streaming media. A disclosed non-limiting disclosed method comprises performing, using a video classifier, video reference point classification of a video stream based on an audio-video dataset; performing, using an audio classifier, audio reference point classification of the audio stream based on the audio-video dataset. The audio-video dataset comprises historical audio and video data of multiple objects and movement that can be used to match and synchronize the audio stream and the corresponding video stream of real time streaming media. In a disclosed embodiment, the system can identify, based on the video classification, a set of video segments in the video stream that display an object, for example that is expected to cause a Doppler-effect sound in the audio stream. In a disclosed embodiment, the system can identify, based on the audio classification, a set of audio segments in the audio stream that exhibit a Doppler-effect sound. A disclosed system can create a set of audio and video synchronization candidates for each permutation of synchronizing each video segment with each audio segment. A disclosed system can identify, based on the video classification, a set of recognized objects with corresponding known sounds in the video stream, and identify based on the audio classification, a set of recognized sounds in the audio stream. A disclosed system can identify an audio and video synchronization candidate from the set of audio-video synchronization candidates for which the highest number of objects in the set of recognized objects are synchronized with a corresponding known sound from the set of recognized sounds.

Figure 2:
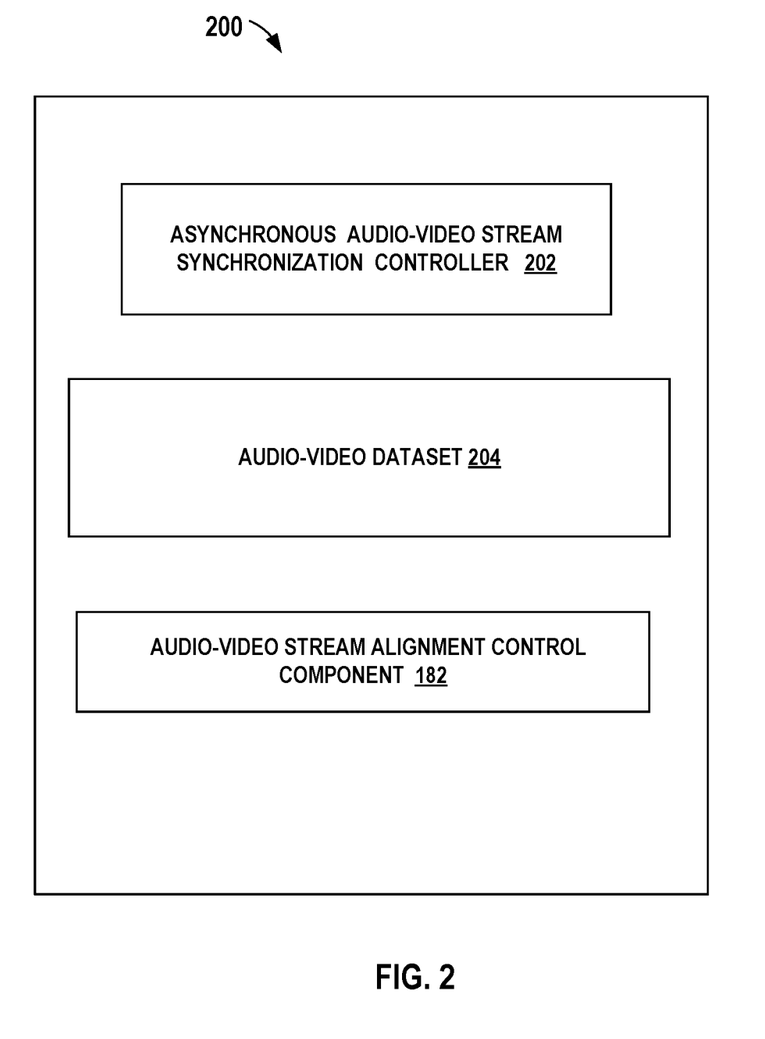
FIG. 2 is a block diagram of an example system for synchronizing content of an audio stream and a corresponding video stream of one or more disclosed embodiments.

FIG. 2 illustrates a system 200 for synchronizing content of an audio stream and a corresponding video stream of one or more disclosed embodiments. System 200 can be used in conjunction with the computer 101 and cloud environment of the computing environment 100 of FIG. 1 for implementing enhanced audio and video content synchronization.

System 200 includes an Asynchronous Audio-Video Stream Alignment Controller 202 or Controller 202, an Audio-Video Dataset 204, and the Audio-Video Stream Alignment Control Component 182 that can be used together to implement enhanced audio and video content synchronization of disclosed embodiments. System 200 can dynamically analyze the audio content of an unaligned audio stream and the video content of an unaligned video stream in real-time. System 200 can perform a dynamic correlation of common, frequent popular objects (train, car or bike movements, and the like) of related reference points in both audio and video frames, for example to enable alignment of the entire audio and video stream based on the reference point alignment.

System 200 can synchronize the audio and video streams by analyzing the content of the video stream and the audio stream and finding appropriate matching points (candidates). System 200 analyzes the context of scenes in the audio content and video content to narrow down the matching points (e.g., from N candidates to M final matching). For example, during the final matching when audio subject (e.g., train whistle sound) and video subject (e.g., incoming train) match, to identify exactly where to place the frames, system 200 further can use Doppler frequency information within the video and audio signals to synchronize the audio and video streams.

Figure 3:
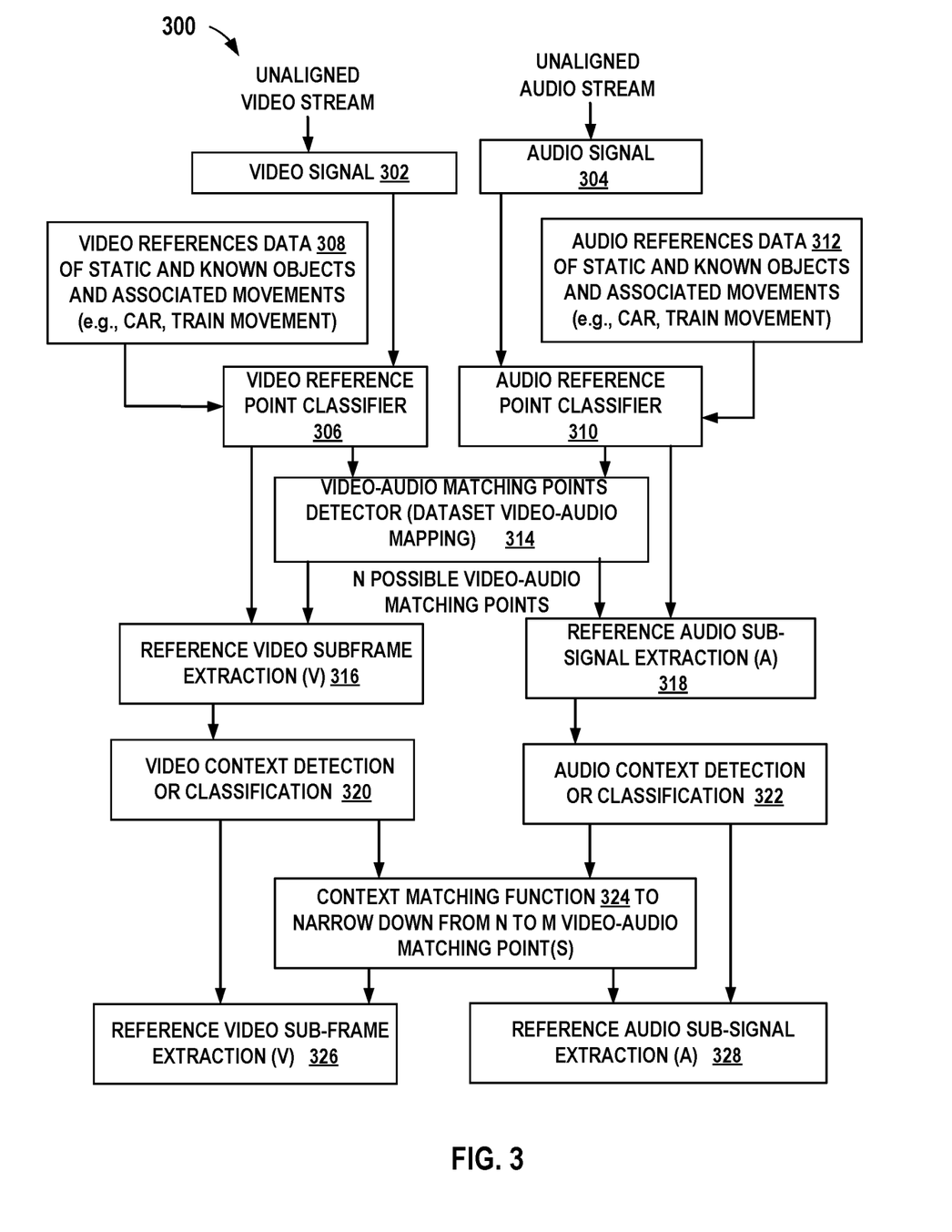
FIG. 3 is a combined flow chart and functional block diagram of example operations and an example functional structure for synchronizing content of an audio stream and a corresponding video stream of one or more disclosed embodiments.

FIG. 3 illustrates example operations and an example functional structure 300 of system 200 for synchronizing content of an audio stream and a corresponding video stream of one or more disclosed embodiments.

An unaligned video input provides a video signal 302 and an unaligned audio input provides an audio signal 302. A video reference point classifier 306 receives the video signal 302 and an input from video reference data 308 of static and known objects and associated movement (e.g., car, train movement, and the like). An audio reference point classifier 308 receives the audio signal 304 and an input from audio reference data 312 of static and known objects and associated movement (e.g., car, train movement, and the like). In a disclosed embodiment, system 200 mines the video references data 308 and the audio reference data 312 from the Audio-Video Dataset 204.

In a disclosed embodiment, the Audio-Video Dataset 204 includes an available public audio-video dataset, used for extracting the video references data 308 and the audio reference data 312. System 200 can mine object audio-video data of video segments including audio mappings to sound, e.g. Doppler effect sound from the Audio-Video Dataset 204 to provide the video references data 308. System 200 can mine object audio-video data of audio segments including the corresponding sound, e.g. corresponding Doppler effect sound from the Audio-Video Dataset 204 to provide the audio references data 312. For example, the Audio-Video Dataset 204 may be a large-scale dataset of manually annotated audio events, including a subset of sound-object pairs. The Audio-Video Dataset 204 may include for example an expanding ontology of audio-object event classes or labels (e.g., audio recording data and video media data) and a collection of human-labeled sound clips (e.g., audio data) drawn from publically available recordings and videos. The Audio-Video Dataset 204 may include an ontology specified as a hierarchical graph of event categories, covering a wide range of human and animal sounds, musical instruments and genres, and common everyday environmental sounds.

As shown in FIG. 3, the video reference point classifier 306 and the audio reference point classifier 306 respectively classify the video references data 308 and the audio reference data 312 and couple the classified video references data to a video-audio matching points detector 314. For example, the video references data 308 corresponds to a given audio-video object from Audio-Video Dataset 204, which includes an image frame or video segment and audio mappings to a given sound for the given audio-video object in the dataset video stream and the audio reference data 312 corresponding to the same audio-video object includes its corresponding sound in the dataset audio stream. For example, the video references data 308 corresponds to train object includes a video train frame where a train is shown and includes audio mappings to the train sound and the audio reference data 312 includes an audio signal of the train sound.

The video-audio matching points detector 314 for example identifies a plurality of video-audio matching points (e.g., N video-audio matching points). The video-audio matching points detector 314 performs content matching using classified data from video reference data 308 and classified data from audio references data 312 extracted from the Audio-Video Dataset 204.

Consider an example of incoming train video and its audio, where the video signal 302 and audio signal of the respective video and audio streams are out of synchronization. The system 200 identifies video references data 308 and the audio reference data 312 for trains and train movement from the Audio-Video Dataset 204. The system 200 identifies multiple matching video-audio train matching points (such as N video-audio train matching points) based on the video references data 308 and the audio reference data 312 for trains and train movement extracted from the Audio-Video Dataset 204. The N video-audio train matching points include train image video segments and mapped sound in the video stream and corresponding audio signals of the mapped sound in the audio stream.

A reference video sub-frame extraction (V) 316 coupled to the video reference point classifier 306 receives video content information and the N video-audio matching points from the video-audio matching points detector 314, used by the reference video sub-frame extraction (V) 316 to extract video sub-frame information. A reference audio sub-signal extraction (A) 318 coupled to the audio reference point classifier 312 receives audio content information and the N video-audio matching points from the video-audio matching points detector 314 used to extract audio sub-signal information. The reference video sub-frame extraction (V) 316 and the reference audio sub-signal extraction (A) 318 are respectively coupled to a video context detection or classifier 320 and the audio context detection or classifier 322. The video context detection or classifier 320 couples video context information for the N video-audio matching points to a context matching function 324. The audio context detection or classifier 322 couples audio context information for the N video-audio matching points to the context matching function 324. The context matching function 324 narrow down the N video-audio matching points to M video-audio matching points (where M is less than N video-audio matching points, e.g., M=1 or 2) based on the video context information and audio context information.

In a disclosed embodiment, system 200 narrows down the N video-audio matching points to M video-audio matching points (e.g., M=1 or 2) based on the context matching of N=20 combinations using the context matching function 324, for example performing existing context derivation techniques. The video context detection or classifier 320, and the context matching function 324 M respectively provide video-audio context information and the M video-audio matching points to a reference video sub-frame extraction (V) 326. The audio context detection or classifier 322 and the context matching function 324 M respectively provide audio context information and the M video-audio matching points and a reference audio sub-signal extraction (A) 328.

In a disclosed embodiment, system 200 can extract context from audio content and video content of the N video-audio matching points using a feature extraction step, for example to represent the audio content in a low dimensional space, for example performing a dimensionality reduction step for context extraction. System 200 can process the two (e.g., M=2) video-audio matching points where both the correct object and correct sound is present. For example in one video-audio matching point, the train is far away and makes a remote low whistle sound. In the second video-audio matching point, the train is close and makes a strong whistle sound. To disambiguate, system 200 can use a Doppler mechanism for identifying corresponding audio and video frequencies. A Doppler frequency variant is correlated with the strength of the signal to ensure correct matching is performed. For example, when the train is far away the audio is lower, and when the train is close (video frame has a strong classification strength for the train), the audio has grown stronger as well. Using Doppler variants of different frequencies computed based on segmenting the elements in the video, the audio frequency can be generated, and features matched for correctly combining audio-video. System 200 can identify Doppler variants of the same object-sound scene (but with different frequencies) and perform the appropriate matching or correlation. For example for a train scene system 200 identifies corresponding audio first Doppler different frequencies when the train is far away and second Doppler different frequencies when the train is close to determine the Doppler variants (e.g., change of pitch of the train whistle) caused by the relative motion of the train.

Figure 4:
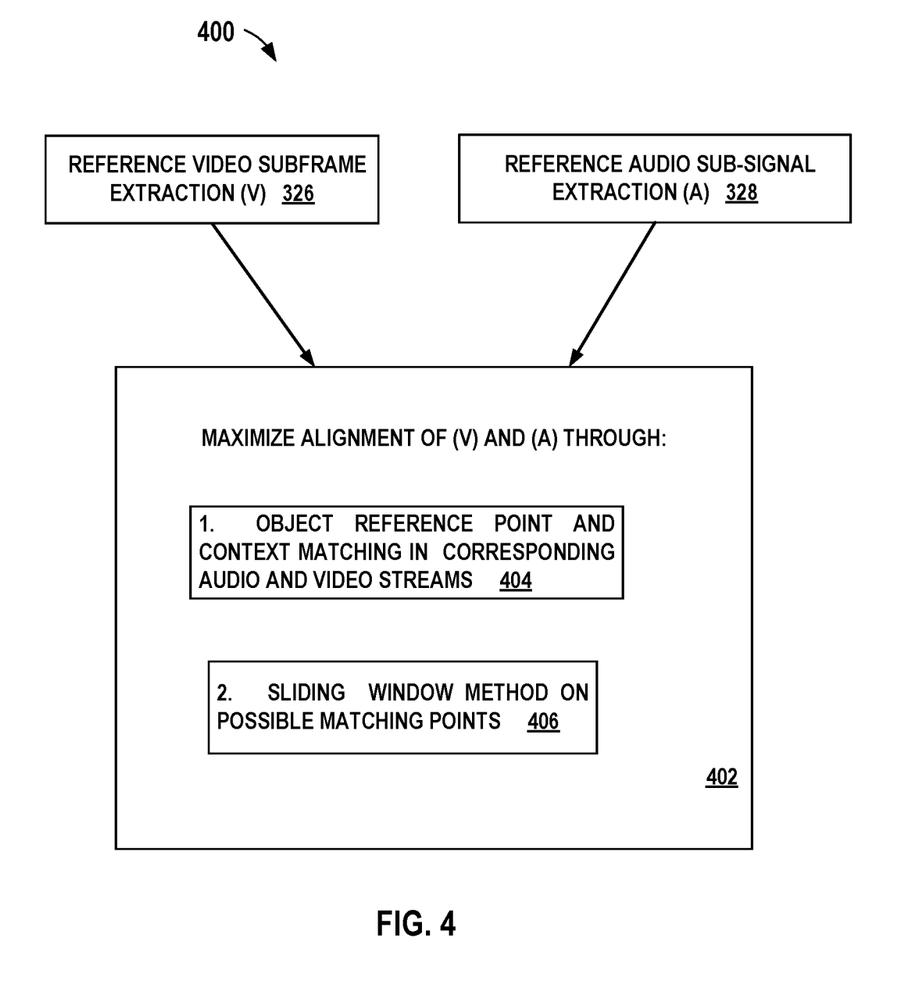
FIG. 4 is a flow chart of example operations of an example method for synchronizing content of an audio stream and a corresponding video stream of one or more disclosed embodiments.

FIG. 4 illustrates example operations of a method 400 for synchronizing content of an audio stream and a corresponding video stream of one or more disclosed embodiments. At block 402, system 200 receives M video-audio matching points from the input reference video sub-frame extraction (V) 326 and the reference audio sub-signal extraction (A) 328. At block 402, system 200 performs operations to maximize alignment of the input reference video sub-frame extraction (V) and the reference audio sub-signal extraction (A). As shown at block 404, system 200 performs an object matching method of corresponding audio and video streams to maximize alignment for synchronizing the video stream and audio stream. As shown at block 406, system 200 optionally performs a sliding window method on the M video-audio matching points to maximize alignment for synchronizing the video stream and audio stream. For example, in a disclosed sliding window method system 200 can process incremental time slices to more accurately a time delay value for synchronizing correction between the audio stream and the video stream.

System 200 can be used in conjunction with the Asynchronous Audio-Video Stream Alignment Controller 202, the Audio-Video Dataset 204, and the Audio-Video Stream Alignment Control Component 182, the computer 101 and cloud environment of the computing environment 100 of FIG. 1 to implement enhanced methods for audio and video stream synchronization of disclosed embodiments.

Figure 5:
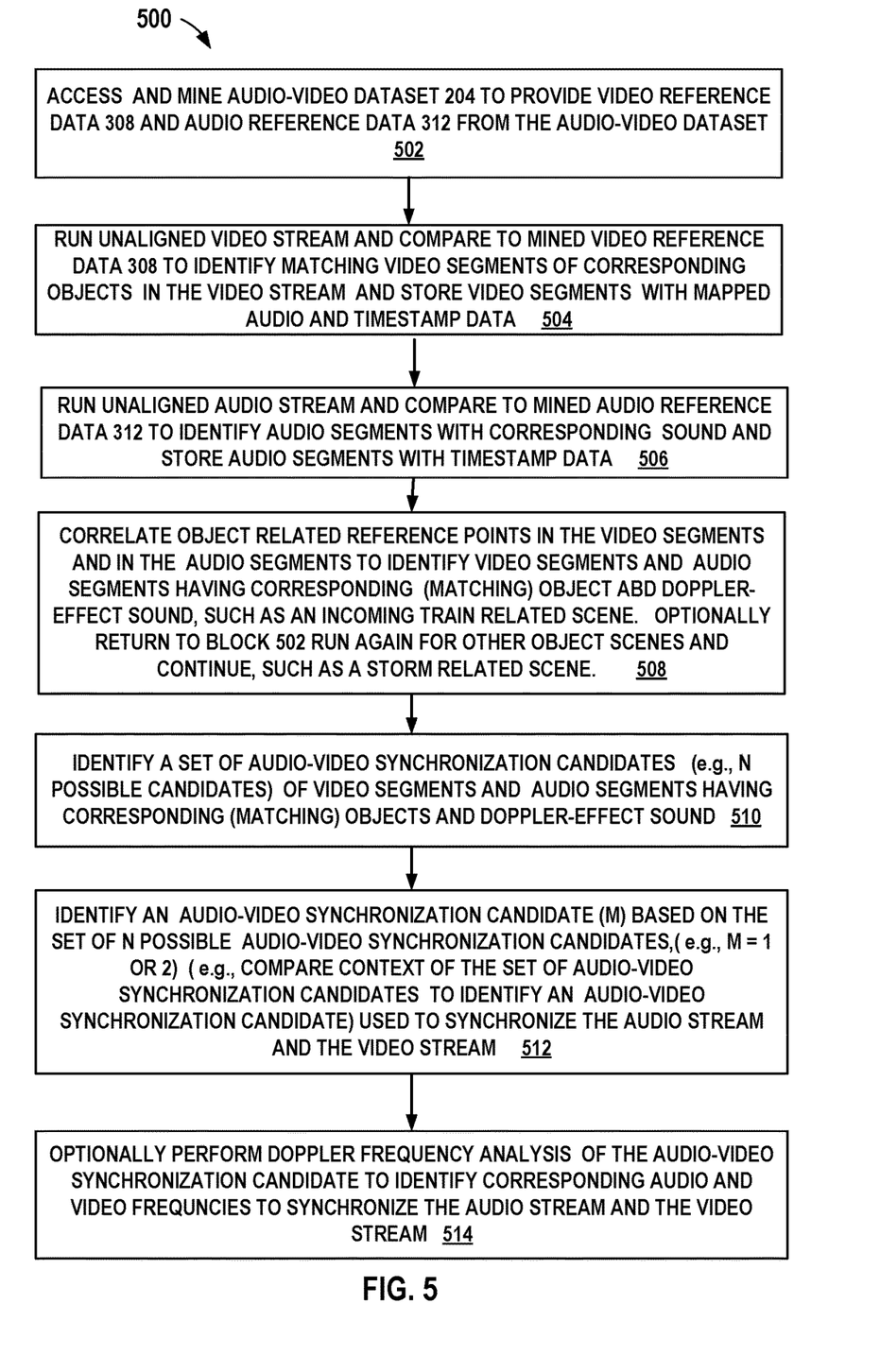
FIG. 5 is a flow chart of example operations of an example audio and video matching method for synchronizing content of an audio stream and a corresponding video stream of one or more disclosed embodiments.

FIG. 5 illustrates example operations of an example audio and video reference point matching method 500 for synchronizing content of an audio stream and a corresponding video stream of one or more disclosed embodiments. Method 500 illustrates example operations of the example audio and video reference point matching of FIG. 3 and block 404 of FIG. 4. At block 502, system 200 accesses and mines the Audio-Video Dataset 204 to provide the video references data 308 and audio references data 312. For example, system 200 can identify a set of images for specific objects that include the Doppler-effect sound in the dataset video stream, such as a train or storm or wind related scenes to provide the video references data 308. At block 504, system 200 runs the unaligned video stream and compares with mined video references data 308 to identify matching video segments of the corresponding objects (e.g., incoming train) in the video stream, and stores the video segments with mapped audio with timestamp data (e.g., time intervals between the video segments). For example, assume there are five (5) such points in video stream. At block 506, system 200 runs the unaligned audio stream and compares against the mined audio references data 312 to identify matching audio segments with the corresponding sound, such as a whistle sound of an incoming train (or generic train sound) and stores the audio segments with timestamp data (e.g., time intervals between the audio segments). For example, assume there are six (6) such points. At block 508, system 200 correlates object related reference points in the video segments and in the audio segments to identify video segments and audio segments having corresponding (matching) objects and Doppler-effect sound. For example, at block 508 system 200 may identify the intersection of matching points in audio and video segments, such as 5*6=30 or N possible combinations which include the incoming train related scene. For example system 200 can identify other possible combinations, such as storm or wind related scenes or school scenes of kids running from school in uniforms (e.g., related audio and video data sets mined from the Audio-Video Dataset 204 and process as described above) to identify other corresponding (matching) objects and Doppler-effect sound of N possible combinations. That is, the system 200 can use multiple different object-audio pairs when synchronizing the video and audio streams. For example, system 200 may select one of identified N possible combinations (e.g., train scenes or storm scenes).

As shown at block 510, system 200 identifies a set of audio-video synchronization candidates, (e.g., N possible candidates) of video segments and audio segments having corresponding (matching) objects and Doppler-effect sound. At block 512, system 200 compares context of the set of audio-video synchronization candidates to narrow down the N possible audio-video synchronization candidates to an improved possible audio-video synchronization candidate M. (e.g., M=1 or 2) based on the matching context. System 200 uses the possible audio-video synchronization candidate M to synchronize the audio stream and video stream. At block 514, system 200 optionally analyzes Doppler frequency information from within signals the audio stream and video stream of the audio-video synchronization candidate M to synchronize the audio stream and video stream.

Figure 6:
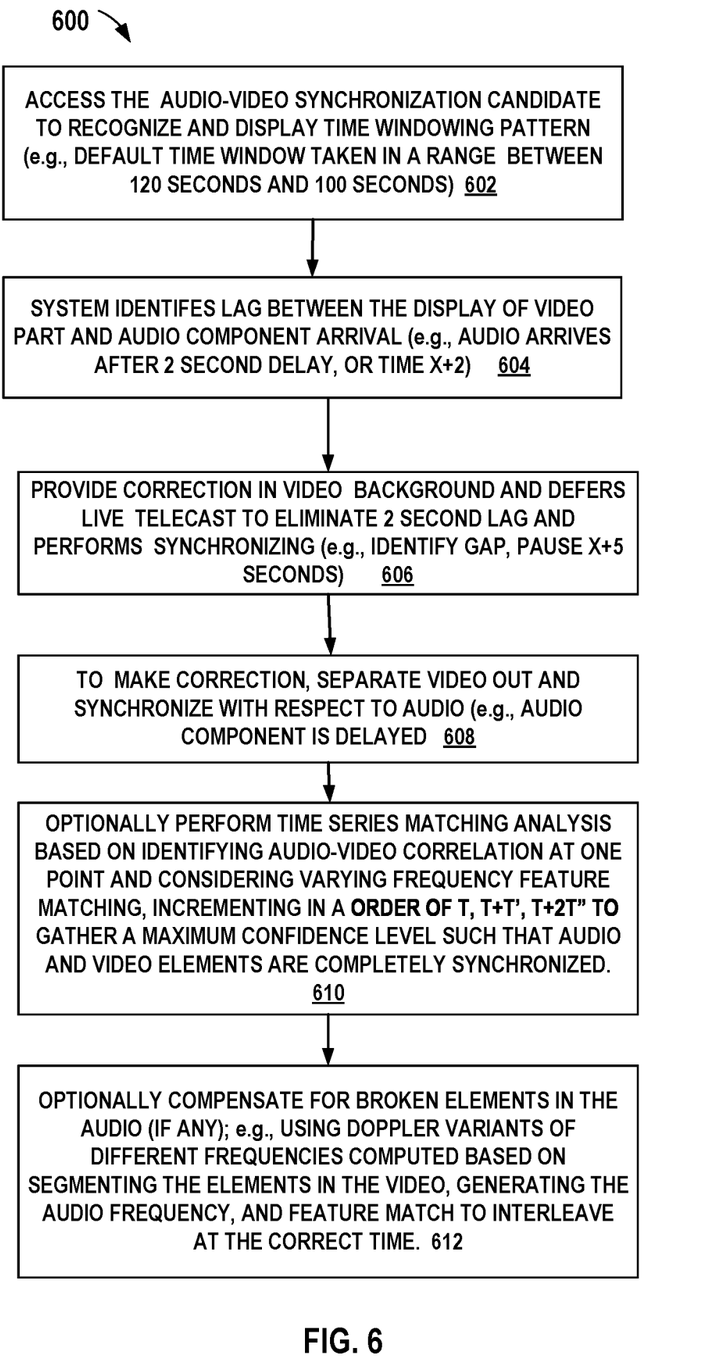
FIG. 6 is a flow chart of example operations of an example sliding window audio and video matching method for synchronizing content of an audio stream and a corresponding video stream of one or more disclosed embodiments.

FIG. 6 illustrates example operations of an example audio and video matching sliding window method 600 for synchronizing content of an audio stream and a corresponding video stream of one or more disclosed embodiments. As shown at block 602, system 200 accesses the possible audio-video synchronization candidate M (identified in FIG. 5) to recognize and display a time windowing pattern; system 200 takes a default time window for example, in a range between 120 seconds and 100 seconds. In a disclosed embodiment at block 604, system 200 compares video components and audio components of time windowing pattern of the audio-video synchronization candidate M and identifies a time difference or lag between the pattern display of a video part and an audio component arrival, (e.g., audio component arrives after a 2-second delay, or time X+two. At block 606, system 200 provides correction of video background, defers the live telecast to eliminate the 2 second lag, and performs synchronizing operation (e.g., system 200 can identify a gap and pause X+5 seconds). At block 608, system 200 optionally to make correction can separate video part out and synchronizes with respect to the audio component, (e.g., audio component is delayed).

At block 610, system optionally performs time series matching analysis based on identifying the audio-visual correlation at one point and considering varying frequency feature matching, incrementing in order of T, T+T', T+2T' to gather a maximum confidence, such that audio and video elements are completely synchronized. At block 610, system optionally compensates for broken elements in the audio, if any; for example using Doppler variants of different frequencies, which can be computed based segmenting element in the video, generating the audio frequency and feature match to interleave at a correct time.

Figure 7:
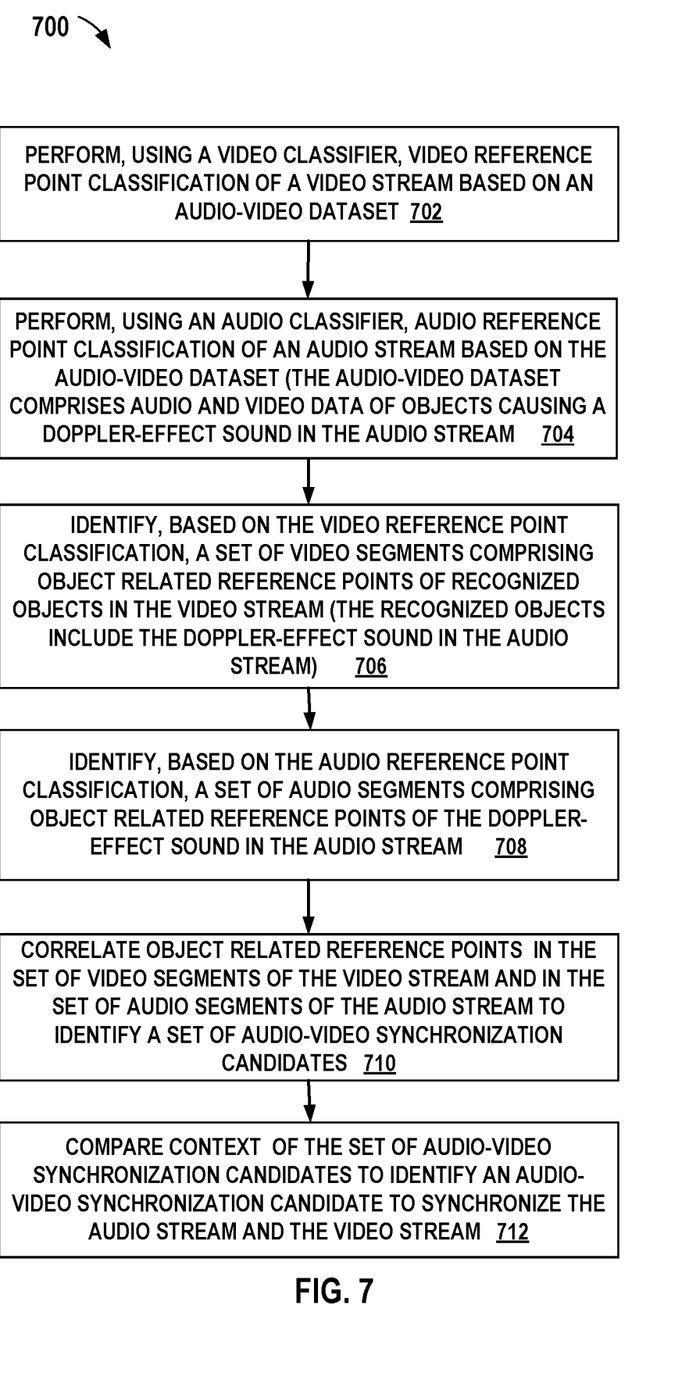
FIG. 7 is a flow chart of an example method for synchronizing content of an audio stream and a corresponding video stream of one or more disclosed embodiments.

FIG. 7 is a flow chart of an example method 700 for synchronizing content of an audio stream and a corresponding video stream of one or more disclosed embodiments. At block 702, system 200 performs, using a video classifier, video reference point classification of a video stream based on an audio-video dataset.

At block 704, system 200 performs, using an audio classifier, audio reference point classification of the audio stream based on the audio-video dataset. For example, the audio-video dataset comprises audio and video data of objects causing a Doppler-effect sound in the audio stream. At block 706, system 200 identifies, based on the video reference point classification, a set of video segments comprising object related reference points of recognized objects in the video stream. For example, the recognized objects include the Doppler-effect sound in the audio stream;

At block 708, system 200 identifies, based on the audio reference point classification, a set of audio segments comprising object related reference points of the Doppler-effect sound in the audio stream. At block 710, system 200 correlates object related reference points in the set of video segments of the video stream and in the set of audio segments of the audio stream to identify a set of audio-video synchronization candidates. At block 712, system 200 compares context of the set of audio-video synchronization candidates to identify an audio-video synchronization candidate to synchronize the audio stream and video stream.

In a disclosed embodiment, system 200 can identify the varying frequencies of the objects or entities identified within the video stream via time slicing window analysis of the set of audio-video synchronization candidates. System 200 can generate audio varying frequencies to be correlated with video content considering the Doppler frequency variants with respect to objects or entities in a given scene (e.g., a train approaching or departing in the background). System 200 can consider various features and cues to identify context of the audio and video streams, such as varying language being used and extracted subtitle information in the textual content of the corresponding media and used in conjunction with varying contextual correlation (e.g., correlation of audio-video scene and frequency variants of the set of audio-video synchronization candidates). System 200 can verify performance through testing by calculating error rate through live stream processing in near real time.

While the foregoing is directed to embodiments of the present invention, other and further embodiments of the invention may be devised without departing from the basic scope thereof, and the scope thereof is determined by the claims that follow.

What is claimed is:

1. A method comprising:
    performing, using a video classifier, video reference point classification of a video stream based on an audio-video dataset; wherein the audio-video dataset comprises audio-video data of objects causing a Doppler-effect sound in a corresponding audio stream;
    performing, using an audio classifier, audio reference point classification of the corresponding audio stream based on the audio-video dataset;
    identifying, based on the video reference point classification, a set of video segments comprising object related reference points in the video stream; wherein the object related reference points in the video stream include the Doppler-effect sound in the audio stream;
    identifying, based on the audio reference point classification, a set of audio segments comprising object related reference points of the Doppler-effect sound in the audio stream;
    correlating object related reference points in the video segments of the video stream and in the audio segments of the audio stream to identify a set of audio-video synchronization candidates; and
    comparing context of the set of the audio-video synchronization candidates to identify an audio-video synchronization candidate to synchronize the audio stream and the video stream.

2. The method of claim 1, wherein comparing context of the set of the audio-video synchronization candidates further comprises performing time slicing sliding window analysis to synchronize the audio stream and video stream.

3. The method of claim 2, wherein performing sliding window analysis to synchronize the audio stream and video stream further comprises separating a video component from an audio component and synchronizing with respect to the audio component, delaying the audio component with respect to the video component to make an alignment correction.

4. The method of claim 1, wherein comparing context of the set of the audio-video synchronization candidates further comprises analyzing Doppler frequency information within audio stream and video stream signals of the audio-video synchronization candidate to identify corresponding audio and video frequencies to synchronize the audio stream and video stream.

5. The method of claim 1, wherein performing, using the video classifier, video reference point classification of a video stream based on the audio-video dataset further comprises matching a set of video object related reference points with a set of audio object related reference points based on the audio-video dataset.

6. The method of claim 1, wherein comparing context of the set of the audio-video synchronization candidates further comprises analyzing content of the object related reference points in the video segments of the video stream and the object related reference points in the audio segments of the audio stream to identify context of the set of the audio-video synchronization candidates.

7. The method of claim 1, wherein comparing context of the set of the audio-video synchronization candidates to identify the audio-video synchronization candidate to synchronize the audio stream and video stream further comprises analyzing content of the object related reference points in the video segments of the video stream and the object related reference points in the audio segments of the audio stream to identify audio features of the set of the audio-video synchronization candidates.

8. The method of claim 7, further comprises matching the audio features of the set of the audio-video synchronization candidates to identify and compare the context of the set of the audio-video synchronization candidates to identify the audio-video synchronization candidate.

9. The method of claim 1, wherein performing, using an audio classifier, audio reference point classification of the corresponding audio stream based on the audio-video dataset further comprises identifying a set of audio reference points in the audio stream matching the Doppler-effect sound of the object related reference points in the video stream.

10. The method of claim 9, wherein identifying a set of audio reference points in the audio stream matching the Doppler-effect sound of the object related reference points in the video stream further comprises identifying context C1 from analyzing the audio stream and context C2 from analyzing the video stream, reducing the set of audio-video synchronization candidates to identify the audio-video synchronization candidate where context C1 equals context C2.

11. A system, comprising:
    a processor; and
    a memory, wherein the memory includes a computer program product configured to perform operations for synchronizing an unaligned audio stream and a corresponding unaligned video stream of real time streaming media, the operations comprising:
    performing, using a video classifier, video reference point classification of a video stream based on an audio-video dataset; wherein the audio-video dataset comprises audio-video data of objects causing a Doppler-effect sound in a corresponding audio stream;
    performing, using an audio classifier, audio reference point classification of the corresponding audio stream based on the audio-video dataset;
    identifying, based on the video reference point classification, a set of video segments comprising object related reference points in the video stream; wherein object related reference points in the video stream include the Doppler-effect sound in the audio stream;
    identifying, based on the audio reference point classification, a set of audio segments comprising object related reference points of the Doppler-effect sound in the audio stream;
    correlating object related reference points in the video segments of the video stream and in the audio segments of the audio stream to identify a set of audio-video synchronization candidates; and comparing context of the set of the audio-video synchronization candidates to identify an audio-video synchronization candidate to synchronize the audio stream and the video stream.

12. The system of claim 11, wherein comparing context of the set of the audio-video synchronization candidates further comprises matching audio features of the set of the audio-video synchronization candidates to identify context of the set of the audio-video synchronization candidates.

13. The system of claim 11, wherein comparing context of the set of the audio-video synchronization candidates further comprises analyzing content of the object related reference points in the video segments of the video stream and in the audio segments of the audio stream to identify context of the set of the audio-video synchronization candidates.

14. The system of claim 11, wherein comparing context of the set of the audio-video synchronization candidates to identify the audio-video synchronization candidate to synchronize the audio stream and video stream further comprises analyzing content of the object related reference points in the video segments of the video stream and in the audio segments of the audio stream to identify audio features of the set of the audio-video synchronization candidates; and matching the audio features.

15. The system of claim 11, wherein identifying a set of object related reference points in the audio stream matching the Doppler-effect sound of the object related reference points in the video stream further comprises identifying context C1 from analyzing content of the audio stream and identifying context C2 from analyzing content of the video stream, identifying where context C1 equals context C2 for reducing the set of audio-video synchronization candidates to the audio-video synchronization candidate.

16. A computer program product for synchronizing an unaligned audio stream and a corresponding unaligned video stream of real time streaming media, the computer program product comprising:
a computer-readable storage medium having computer-readable program code embodied therewith, the computer-readable program code executable by one or more computer processors to perform an operation comprising:
performing, using a video classifier, video reference point classification of a video stream based on an audio-video dataset; wherein the audio-video dataset comprises audio-video data of objects causing a Doppler-effect sound in a corresponding audio stream;
performing, using an audio classifier, audio reference point classification of the corresponding audio stream based on the audio-video dataset;
identifying, based on the video reference point classification, a set of video segments comprising object related reference points in the video stream; wherein object related reference points in the video stream include the Doppler-effect sound in the audio stream;
identifying, based on the audio reference point classification, a set of audio segments comprising object related reference points of the Doppler-effect sound in the audio stream;
correlating object related reference points in the video segments of the video stream and in the audio segments of the audio stream to identify a set of audio-video synchronization candidates; and
comparing context of the set of the audio-video synchronization candidates to identify an audio-video synchronization candidate to synchronize the audio stream and the video stream.

17. The computer program product of claim 16, wherein comparing context of the set of the audio-video synchronization candidates further comprises matching audio features of the set of the audio-video synchronization candidates to identify context of the set of the audio-video synchronization candidates.

18. The computer program product of claim 16, wherein comparing context of the set of the audio-video synchronization candidates further comprises analyzing content of the object related reference points in the video segments of the video stream and in the audio segments of the audio stream to identify context of the set of the audio-video synchronization candidates.

19. The computer program product of claim 16, wherein comparing context of the set of the audio-video synchronization candidates to identify the audio-video synchronization candidate to synchronize the audio stream and video stream further comprises analyzing content of the object related reference points in the video segments of the video stream and in the audio segments of the audio stream to identify audio features of the set of the audio-video synchronization candidates; and matching the audio features.

20. The computer program product of claim 16, wherein identifying a set of object related reference points in the audio stream matching the Doppler-effect sound of the object related reference points in the video stream further comprises identifying context C1 from analyzing content of the audio stream and identifying context C2 from analyzing content of the video stream, identifying where context C1 equals context C2 for reducing the set of audio-video synchronization candidates to the audio-video synchronization candidate.

* * * * *